US012579410B2

(12) United States Patent
Liu et al.

(10) Patent No.: US 12,579,410 B2
(45) Date of Patent: Mar. 17, 2026

(54) TECHNIQUES FOR DATA PROCESSING PREDICTIONS

(71) Applicant: BEIJING BAIDU NETCOM SCIENCE TECHNOLOGY CO., LTD., Beijing (CN)

(72) Inventors: Haocheng Liu, Beijing (CN); Cai Chen, Beijing (CN); Bohao Feng, Beijing (CN); Shijie Xu, Beijing (CN); Jian Tian, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 721 days.

(21) Appl. No.: 18/053,303

(22) Filed: Nov. 7, 2022

(65) Prior Publication Data

US 2023/0112576 A1     Apr. 13, 2023

(30) Foreign Application Priority Data

Nov. 10, 2021   (CN) .......................... 202111328846.4

(51) Int. Cl.
*G06N 3/047*         (2023.01)
(52) U.S. Cl.
CPC ................................... *G06N 3/047* (2023.01)
(58) Field of Classification Search
CPC ..... G06N 3/047; G06Q 30/0201; G06Q 40/03
(Continued)

(56) References Cited

U.S. PATENT DOCUMENTS 9,727,616 B2 *   8/2017   Wu et al. ............. G06F 17/3053
10,169,715 B2 *   1/2019   Dirac et al. ............. G06N 99/00
(Continued)

FOREIGN PATENT DOCUMENTS

CN          110111198 A      8/2019
CN          110866819 A      3/2020
(Continued)

OTHER PUBLICATIONS

J. O. Sinayobye, K. S. Kaawaase, F. N. Kiwanuka and R. Musabe, "Hybrid Model of Correlation Based Filter Feature Selection and Machine Learning Classifiers Applied on Smart Meter Data Set," 2019 IEEE/ACM Symposium on Software Engineering in Africa (SEiA), Montreal, QC, Canada, 2019, pp. 1-10. (Year: 2019).*
(Continued)

*Primary Examiner* — Bennett M Sigmond
*Assistant Examiner* — George N. Proios
(74) *Attorney, Agent, or Firm* — FisherBroyles, LLP

(57)          ABSTRACT

Data processing techniques are provided. The techniques include: obtaining a first prediction data set, a model feature list and configuration information, wherein the model feature list indicates a plurality of features required by a data analysis model; generating a second prediction data set based on the model feature list and the first prediction data set, wherein the feature dimension of prediction data in the second prediction data set is smaller than the feature dimension of prediction data in the first prediction data set; performing feature transformation on a feature of the prediction data in the second prediction data set based on the configuration information to generate a third prediction data set; and inputting the third prediction data set into the data analysis model to obtain a prediction result.

18 Claims, 5 Drawing Sheets

(58) Field of Classification Search
USPC .......................................................... 705/38
See application file for complete search history.

(56) References Cited

U.S. PATENT DOCUMENTS

| | | | |
|---|---|---|---|
| 2011/0004509 A1* | 1/2011 | Wu et al. ........................ | 705/10 |
| 2019/0324444 A1* | 10/2019 | Cella et al. ........ | G05B 23/0297 |
| 2020/0372302 A1* | 11/2020 | Tadepalli et al. .... | G06K 9/6261 |
| 2021/0383544 A1* | 12/2021 | Endres ..................... | G06T 7/10 |
| 2022/0103589 A1* | 3/2022 | Shen et al. .......... | H04L 63/1433 |
| 2022/0343122 A1* | 10/2022 | Takeuchi et al. .... | G06K 9/6298 |

FOREIGN PATENT DOCUMENTS

| | | |
|---|---|---|
| CN | 111081353 A | 4/2020 |
| CN | 111738331 A | 10/2020 |
| CN | 112200659 A | 1/2021 |
| CN | 112700324 A | 4/2021 |
| CN | 112785441 A | 5/2021 |

OTHER PUBLICATIONS

Extended European Search Report issued in the counterpart EP application 22205857.0, official mailing date: Apr. 5, 2023, 5 pages.
Office Action of the counterpart CN application 2021113288464, official mailing date: Mar. 29, 2023, 13 pages.

* cited by examiner

TECHNIQUES FOR DATA PROCESSING PREDICTIONS

CROSS REFERENCE TO RELATED APPLICATION

This application claims priority to Chinese Patent Application No. 202111328846.4, filed on Nov. 10, 2021, the contents of which are hereby incorporated by reference in their entirety for all purposes.

TECHNICAL FIELD

The present disclosure relates to the technical field of computers, in particular to the technical field of big data, and specifically relates to data processing techniques including a method, an electronic device, a computer readable storage medium.

BACKGROUND

In recent years, a big data technology has been developing continuously, especially in financial risk control scenarios, and has been widely used. Using relevant big data, a financial risk control model can be constructed, and the financial risk control model can be used to judge the overdue probability of the user's loan, the overdue amount of the user's loan and the like.

Methods described in this section are not necessarily those previously envisaged or adopted. Unless otherwise specified, it should not be assumed that any method described in this section is considered the prior art only because it is included in this section. Similarly, unless otherwise specified, the issues raised in this section should not be considered to have been universally acknowledged in any prior art.

SUMMARY

The present disclosure provides techniques including a data processing method, an electronic device, a computer readable storage medium.

According to one aspect of the present disclosure, a data processing method is provided, and includes: obtaining a first prediction data set, a model feature list and configuration information, wherein the model feature list indicates a plurality of features required by a data analysis model; generating a second prediction data set based on the model feature list and the first prediction data set, wherein the feature dimension of prediction data in the second prediction data set is smaller than the feature dimension of prediction data in the first prediction data set; performing feature transformation on a feature of the prediction data in the second prediction data set based on the configuration information to generate a third prediction data set; and inputting the third prediction data set into the data analysis model to obtain a prediction result.

According to one aspect of the present disclosure, an electronic device is provided, including: one or more processors; a memory storing one or more programs configured to be executed by the one or more processors, the one or more programs including instructions for: obtaining a first prediction data set, a model feature list and configuration information, wherein the model feature list indicates a plurality of features required by a data analysis model; generating a second prediction data set based on the model feature list and the first prediction data set, wherein the feature dimension of prediction data in the second prediction data set is smaller than the feature dimension of prediction data in the first prediction data set; performing feature transformation on a feature of the prediction data in the second prediction data set based on the configuration information to generate a third prediction data set; and inputting the third prediction data set into the data analysis model to obtain a prediction result.

According to one aspect of the present disclosure, a non-transitory computer-readable storage medium storing one or more programs is provided, the one or more programs comprising instructions, which when executed by one or more processors of an electronic device, cause the electronic device to: obtaining a first prediction data set, a model feature list and configuration information, wherein the model feature list indicates a plurality of features required by a data analysis model; generating a second prediction data set based on the model feature list and the first prediction data set, wherein the feature dimension of prediction data in the second prediction data set is smaller than the feature dimension of prediction data in the first prediction data set; performing feature transformation on a feature of the prediction data in the second prediction data set based on the configuration information to generate a third prediction data set; and inputting the third prediction data set into the data analysis model to obtain a prediction result.

According to one or more embodiments of the present disclosure, an automated modeling process can be formed to realize end-to-end modeling.

It should be understood that the content described in this part is not intended to identify key or important features of the embodiments of the present disclosure, nor is it configured to limit the scope of the present disclosure. Other features of the present disclosure will be easily understood by the following description.

BRIEF DESCRIPTION OF THE DRAWINGS

The accompanying drawings exemplarily illustrate embodiments and form part of the description, which, together with the textual description of the description, is configured to explain example implementations of the embodiments. The illustrated embodiments are for illustrative purposes only and do not limit the scope of the claims. In all the drawings, the same reference numerals refer to similar but not necessarily identical elements.

DETAILED DESCRIPTION

The example embodiments of the present disclosure are described below in combination with the accompanying drawings, including various details of the embodiments of the present disclosure to facilitate understanding, which should be considered only example. Therefore, those ordinarily skilled in the art should recognize that various changes and modifications may be made to the embodiments described herein without departing from the scope of the present disclosure. Similarly, for clarity and conciseness, the description of well-known functions and structures is omitted from the following description.

In the present disclosure, unless otherwise specified, the terms "first", "second" and the like are configured to describe various elements and are not intended to limit the positional relationship, temporal relationship or importance relationship of these elements. These terms are only configured to distinguish one element from another element. In some examples, a first element and a second element may point to the same instance of the element, and in some cases, based on the context description, they can also refer to different instances.

The terms used in the description of the various examples in the present disclosure are only for the purpose of describing specific examples and are not intended to be limiting. Unless the context clearly indicates otherwise, if the quantity of elements is not specifically limited, the element may be one or more. In addition, the term "and/or" as used in the present disclosure covers any and all possible combinations of the listed items.

The embodiments of the present disclosure will be described in detail below in combination with the accompanying drawings.

Figure 1:
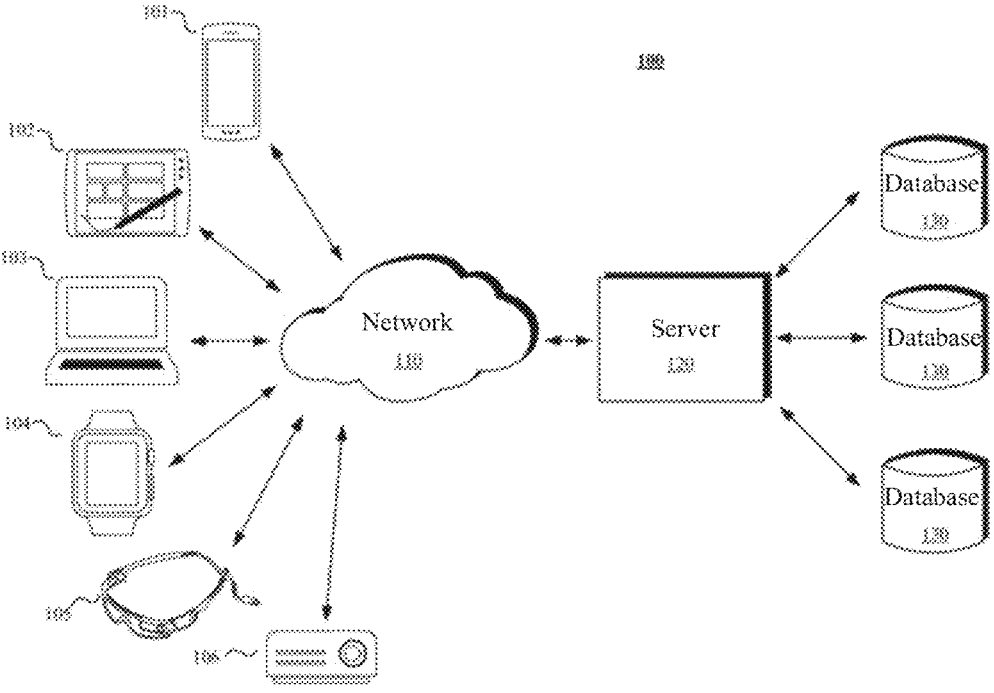
FIG. 1 shows a schematic diagram of an example system in which various methods described herein may be implemented according to an embodiment of the present disclosure.

FIG. 1 shows a schematic diagram of an example system 100 in which various methods and apparatuses described herein may be implemented according to an embodiment of the present disclosure. Referring to FIG. 1, the system 100 includes one or more client devices 101, 102, 103, 104, 105 and 106, a server 120 and one or more communication networks 110 coupling the one or more client devices to the server 120. The client devices 101, 102, 103, 104, 105 and 106 may be configured to execute one or more applications.

In the embodiment of the present disclosure, the server 120 may run to make one or more service or software applications implementing a data processing method and a model constructing method capable of being executed.

In certain embodiments, the server 120 may further provide other service or software applications that may include non-virtual environments and virtual environments. In certain embodiments, these services may be provided as web-based services or cloud services, such as being provided to users of the client devices 101, 102, 103, 104, 105 and/or 106 under a software as a service (SaaS) model.

In a configuration shown in FIG. 1, the server 120 may include one or more components implementing functions executed by the server 120. These components may include a software component, a hardware component or their combinations that may be executed by one or more processors. The users operating the client devices 101, 102, 103, 104, 105 and/or 106 may sequentially utilize one or more client applications to interact with the server 120 to utilize services provided by these components. It should be understood that various different system configurations are possible, which may be different from the system 100. Therefore, FIG. 1 is an example of a system for implementing the various methods described herein, and is not intended to be limiting.

The users may use the client devices 101, 102, 103, 104, 105 and/or 106 to input configuration information. The client devices may provide interfaces enabling the users of the client devices to be capable of interacting with the client devices. The client devices may further output information to the users via the interfaces. Although FIG. 1 only depicts six client devices, those skilled in the art can understand that the present disclosure may support any quantity of client devices.

The client devices 101, 102, 103, 104, 105 and/or 106 may include various types of computer devices, such as a portable handheld device, a general-purpose computer (such as a personal computer and a laptop computer), a workstation computer, a wearable device, a gaming system, a thin client, various message transceiving devices, a sensor or other sensing devices, etc. These computer devices may run various types and versions of software applications and operating systems, such as MICROSOFT Windows, APPLE iOS, UNIX-like operating systems, and Linux or Linux-like operating systems (such as GOOGLE Chrome OS); or include various mobile operating systems, such as MICROSOFT Windows Mobile OS, iOS, Windows Phone and Android. The portable handheld device may include a cell phone, a smart phone, a tablet computer, a personal digital assistant (PDA) and the like. The wearable device may include a head-mounted display and other devices. The gaming system may include various handheld gaming devices, gaming devices supporting the Internet and the like. The client devices may execute various different applications, such as various Internet-related applications, communication applications (such as e-mail applications), and short message service (SMS) applications, and may use various communication protocols.

The network 110 may be any type of network well known to those skilled in the art, which may use any one of various available protocols (including but not limited to TCP/IP, SNA, IPX, etc.) to support data communication. Only as examples, one or more networks 110 may be a local area network (LAN), an Ethernet-based network, a token ring, a wide area. network (WAN), the Internet, a virtual network, a virtual private network (VPN), an intranet, an external network, a public switched telephone network (PSTN), an infrared network, a wireless network (e.g., Bluetooth, WIFI), and/or any combination of these and/or other networks.

The server 120 may include one or more general-purpose computers, dedicated server computers (e.g., PC (personal computer) servers, UNIX servers, and midrange servers), blade servers, mainframe computers, server clusters, or any other suitable arrangement and/or combination. The server 120 may include one or more virtual machines running virtual operating systems, or other computing frameworks involving virtualization (e.g., one or more flexible pools of logical storage devices that may be virtualized to maintain virtual storage devices of the server). In various embodiments, the server 120 may run one or more service or software applications providing the functions described below.

A computing unit in the server 120 may run one or more operating systems including any above operating system and any commercially available server operating system. The server 120 may further run any one of various additional server applications and/or intermediate layer applications, including an HTTP server, an FTP server, a CGI server, a JAVA server, a database server and the like.

In some implementations, the server 120 may include one or more applications to analyze and combine data feed and/or event updating received from the users of the client devices 101, 102, 103, 104, 105 and 106. The server 120 may further include one or more applications to display data feed and/or real-time events via one or more display devices of the client devices 101, 102, 103, 104, 105 and 106.

In some implementations, the server 120 may be a server of a distributed system, or a server combined with a block chain. The server 120 may further be a cloud server, or a smart cloud computing server or smart cloud host with the artificial intelligence technology. The cloud server is a host product in a cloud computing service system to overcome the defects of large management difficulty and weak business expansibility existing in traditional physical host and virtual private server (VPS) services.

The system 100 may further include one or more databases 130. In certain embodiments, these databases may be configured to store data and other information. For example, one or more of the databases 130 may be configured to store, for example, information of video files and video files. The data storage bases 130 may reside at various positions. For example, a data storage base used by the server 120 may be local to the server 120 or may be away from the server 120 and may communicate with the server 120 via and based on a network or specific connection. The data storage bases 130 may be of different types. In certain embodiments, the data storage base used by the server 120 may be a database, such as a relational database. One or more of these databases may respond to a command to store, update and retrieval data to and from the databases.

In certain embodiments, one or more of the databases 130 may further be used by applications to store application data. The databases used by the applications may be different types of databases, such as a key value storage base, an object storage base or a conventional storage base supported by a file system.

The system 100 of FIG. 1 may be configured and operated in various modes to be capable of applying various methods and apparatuses described according to the present disclosure.

Figure 2:
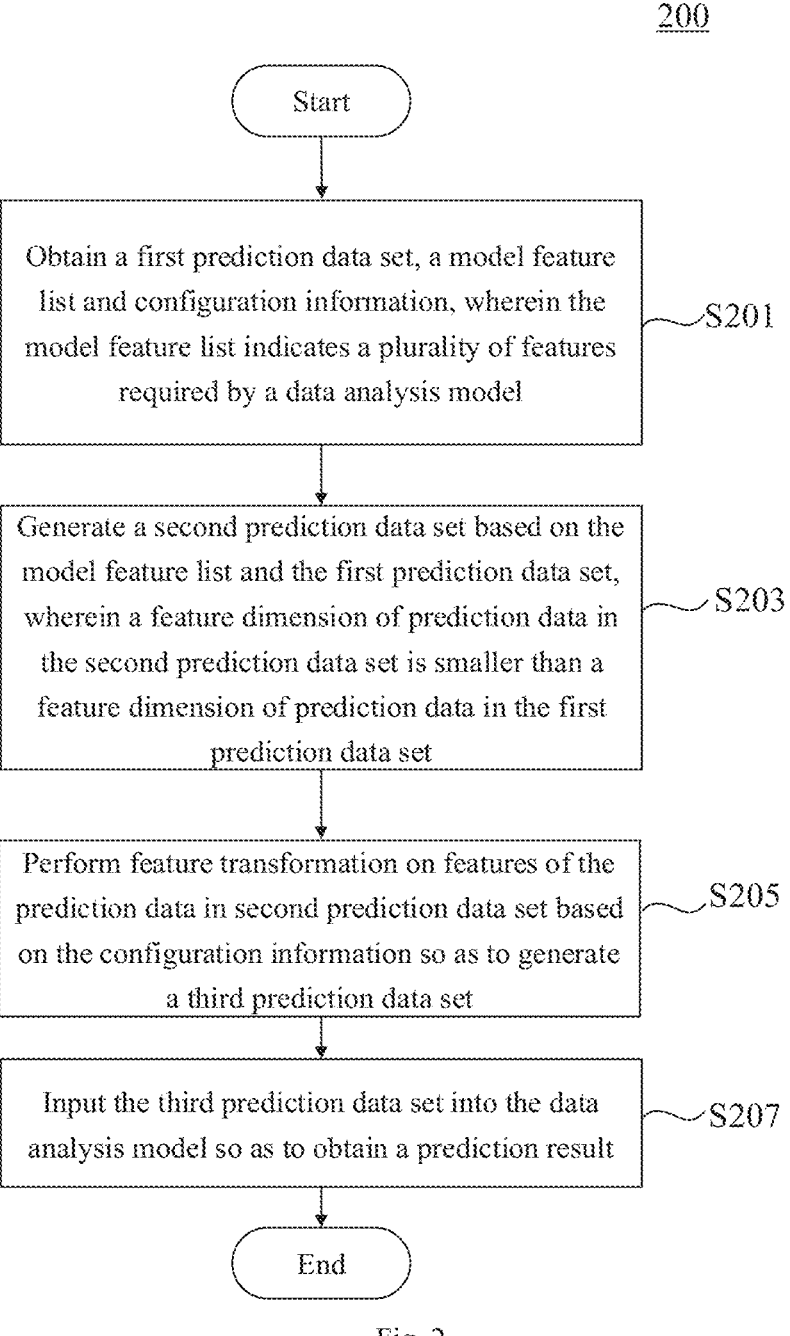
FIG. 2 shows a flow diagram of a data processing method according to an embodiment of the present disclosure.

FIG. 2 shows a flow diagram of a data processing method 200 according to an embodiment of the present disclosure. As shown in FIG. 2, the method may include:

step S201, a first prediction data set, a model feature list and configuration information are obtained, wherein the model feature list indicates a plurality of features required by a data analysis model;

step S203, a second prediction data set is generated based on the model feature list and the first prediction data set, wherein the feature dimension of prediction data in the second prediction data set is smaller than the feature dimension of prediction data in the first prediction data set;

step S205, feature transformation is performed on features of the prediction data in second prediction data set based on the configuration information to generate a third prediction data set; and step S207, the third prediction data set is input into the data analysis model o obtain a prediction result.

According to the data processing method of the present disclosure, in order to facilitate the users to use the data analysis model, the users only need to input the first prediction data set and the configuration information, and the data analysis model may set various parameters in the data analysis model according to the configuration information and select an appropriate algorithm to perform operations such as feature transformation on the first prediction data set. The users do not need to care about a configuration method, input and output of the data analysis model in each link of data processing when using the data analysis model, but only need to input the first prediction data set and the configuration information in the initial stage of the data analysis model to obtain the result, and end-to-end data analysis model application is achieved.

The various steps of the data processing method 200 according to the present disclosure will be described in detail below.

In step S201, the users may input the first prediction data set through the client, and submit the configuration information, wherein the configuration information records various parameters and various algorithms in the application process of the data analysis model; and the model feature list is a list of features required by the data analysis model, and is recorded in the data analysis model.

In step S203, based on the model feature list, the feature of each piece of sample data in the first prediction data set is screened, and only the features required by the data analysis model are retained to generate the second prediction data set.

According to some embodiments, the configuration information includes a type of a statistical value, and performing feature transformation on the features of the prediction data in the second prediction data set based on the configuration information to generate the third prediction data set includes: obtaining at least one statistic value of each piece of prediction data in the second prediction data set within a preset time period; and forming the at least one statistical value into a vector, and using the vector to replace data corresponding to the statistical value in the second prediction data set to obtain the third prediction data set.

According to some embodiments, the type of the statistical value includes at least one of: a mean, a variance, a range, a consecutively increasing number and a consecutively decreasing number.

For example, when predicting a behavior of a person A according to the prediction data of the person A, a data value m corresponding to a feature M of the person A needs to be replaced with a vector. Specifically, the data values corresponding to the feature M of the person A in the past 6 months are obtained, there are 6 data values in total, the mean value $m_1$, the variance $m_2$, the range $m_3$, the consecutively increasing number $m_4$ and the consecutively decreasing number $m_5$ of the 6 data values are calculated respectively, and a vector m' ($m_1$, $m_2$, $m_3$, $m_4$, $m_5$) is formed, and the data values m are replaced with the vector m' ($m_1$, $m_2$, $m_3$, $m_4$, $m_5$) for computation in the data analysis model.

By replacing the original data with the vector of the statistical values, the impact of historical data may be taken into account in the data analysis model, and the accuracy of prediction is improved.

According to some embodiments, in step S205, in response to determining that the feature of the prediction data in the second prediction data set is a discrete feature, a weight of evidence substitution operation is performed on the feature of the prediction data in the second prediction data set.

According to some embodiments, in step S205, in response to determining that the feature of the prediction data in the second prediction data set is a continuous feature, at least one of: a binning operation and a weight of evidence substitution operation are/is performed on the feature of the prediction data in the second prediction data set to obtain the third prediction data set.

For example, when predicting the behavior of the person A based on the prediction data of the person A, it is necessary to perform the weight of evidence substitution operation on the discrete feature N to obtain a WOE value of a data value corresponding to the feature N; and the weight of evidence substitution operation is performed after the binning operation is performed on the continuous feature O to obtain a weight of evidence (WOE) value of a data value corresponding to the feature O. For the discrete feature N, the WOE value of the feature N is calculated according to a percentage of positive sample data and a percentage of negative sample data in the first prediction data set. For the continuous feature O, the continuous feature is converted into the discrete feature through the binning operation first, and then the WOE value of the feature O is calculated according to the percentage of the positive sample data and the percentage of the negative sample data in the first prediction data set.

Through the weight of evidence substitution operation, the original data value may be replaced with the WOE value of the data. Since in the binning operation, missing values may be individually binned, i.e., the missing values are given new values (that is, the bins which the missing values belong to), the data analysis models can handle the missing values. Meanwhile, since in the binning operation, abnormal values may be classified separately, thus reducing the impact of the abnormal values on the data analysis model.

According to some embodiments, the data processing method 200 may further include: a performance evaluation index of the data analysis model is calculated according to the prediction result; and an alert is given out in response to determining that the performance evaluation index is out of a preset threshold range.

The prediction result of the data analysis model may be biased. For example, the prediction result is that the person A will be overdue for loan repayment, but in fact the person A repays the loan normally before the repayment date, so the data analysis model makes a wrong judgment. When the data analysis model makes wrong judgments too much, the alert may be given out to remind the users to adjust various parameters of the data analysis model to better adapt to the current data.

In some examples, a model rule set may also be generated according to the obtained data analysis model to explain the relationship between various features in the data analysis model and the relationship between each feature in the data analysis model and the prediction result.

In some examples, the data analysis model may also be solidified in an institutional business system of the users, which is convenient for the users to use.

In some examples, by applying the data analysis model constructed by the above method 200, the Area Under Curve/Kolmogorov-Smirnov (AUC/KS) index of the data analysis model is improved by 5%-10%.

Figure 3:
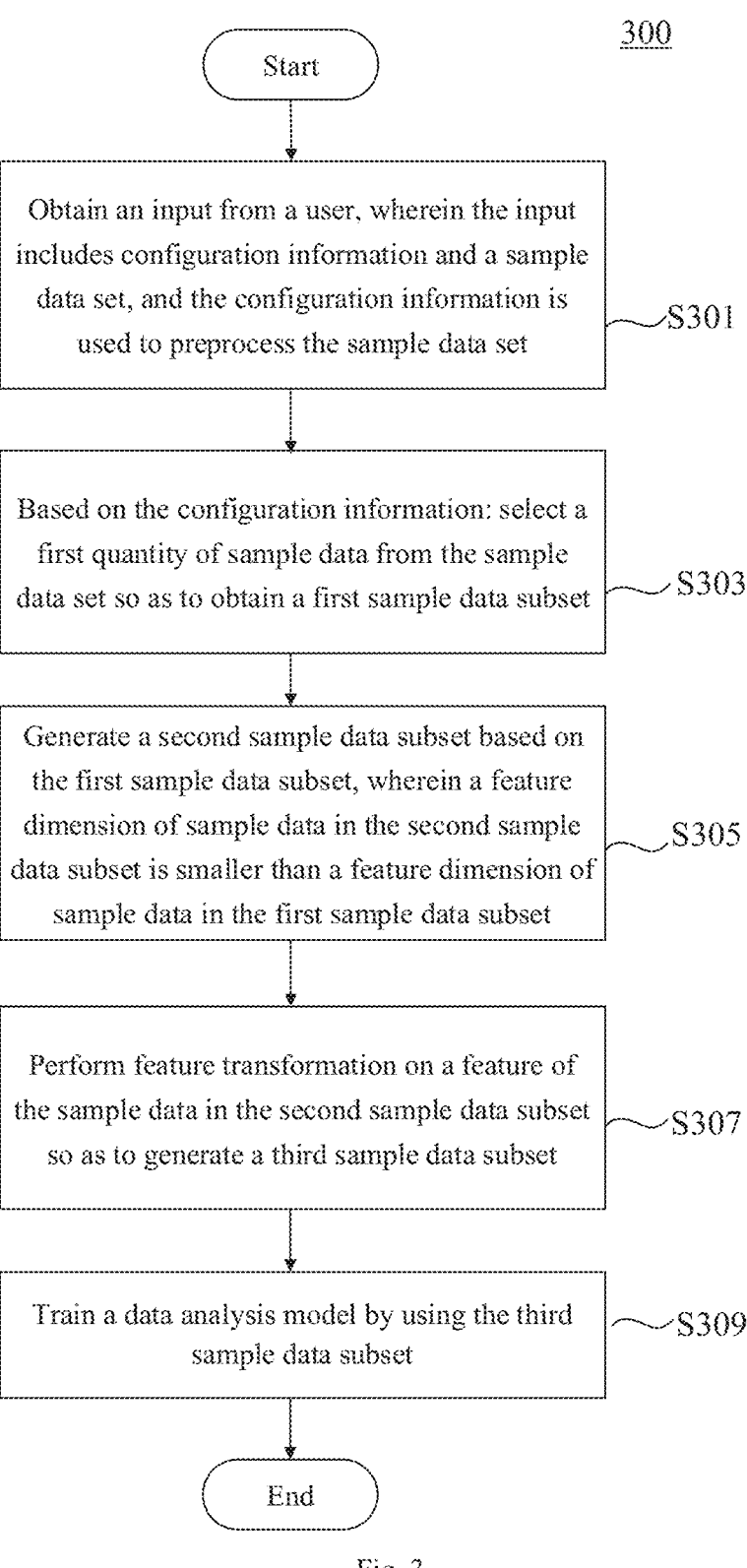
FIG. 3 shows a flow diagram of a model constructing method according to an embodiment of the present disclosure.

According to an aspect of the present disclosure, a method 300 for constructing a data analysis model is provided. FIG. 3 shows a flow diagram of a method for constructing a data analysis model according to an embodiment of the present disclosure. As shown in FIG. 3, the method 300 includes:

step S301, an input from a user is obtained, wherein the input includes configuration information and a sample data set, and the configuration information is used to preprocess the sample data set; and based on the configuration information:

step S303, a first quantity of sample data is selected from the sample data set to obtain a first sample data subset;

step S305, a second sample data subset is generated based on the first sample data subset, wherein the feature dimension of sample data in the second sample data subset is smaller than the feature dimension of sample data in the first sample data subset;

step S307, feature transformation is performed on a feature of the sample data in the second sample data subset to generate a third sample data subset; and step S309, the data analysis model is trained by the third sample data subset.

Through the method 300, the entire process of constructing the data analysis model may be automatically performed through the configuration information input by the user, including a plurality of links such as sample data screening, sample feature screening, sample feature transformation, and model training. The user does not need to care about the details of input and output of each link, and end-to-end modeling is realized. At the same time, due to the links of sample data screening, sample feature screening, and sample feature transformation before model training, some sample data and features with low relevance or reliability to this application are filtered, which enhances the interpretability of the data analysis model, prevents the defect of overfitting of historical data caused by too many features, improves the accuracy of the prediction result of the data analysis model, and avoids the shortcomings of frequent iterations of traditional methods at the same time.

The various steps of the method 300 for constructing the data analysis model according to the present disclosure will be described in detail below.

According to some embodiments, in step S301, the configuration information and the sample data set from the user may be obtained. In the early stage, it may meet the needs of the user, extract data, and fuse the data in a plurality of data tables to obtain the sample data set. The data obtained from the user is organized into a data wide table, and then processing such as sample analysis and feature analysis is performed on the data wide table. In some examples, positive sample data may be data that is overdue, and negative sample data may be data that is not overdue.

Figure 4:
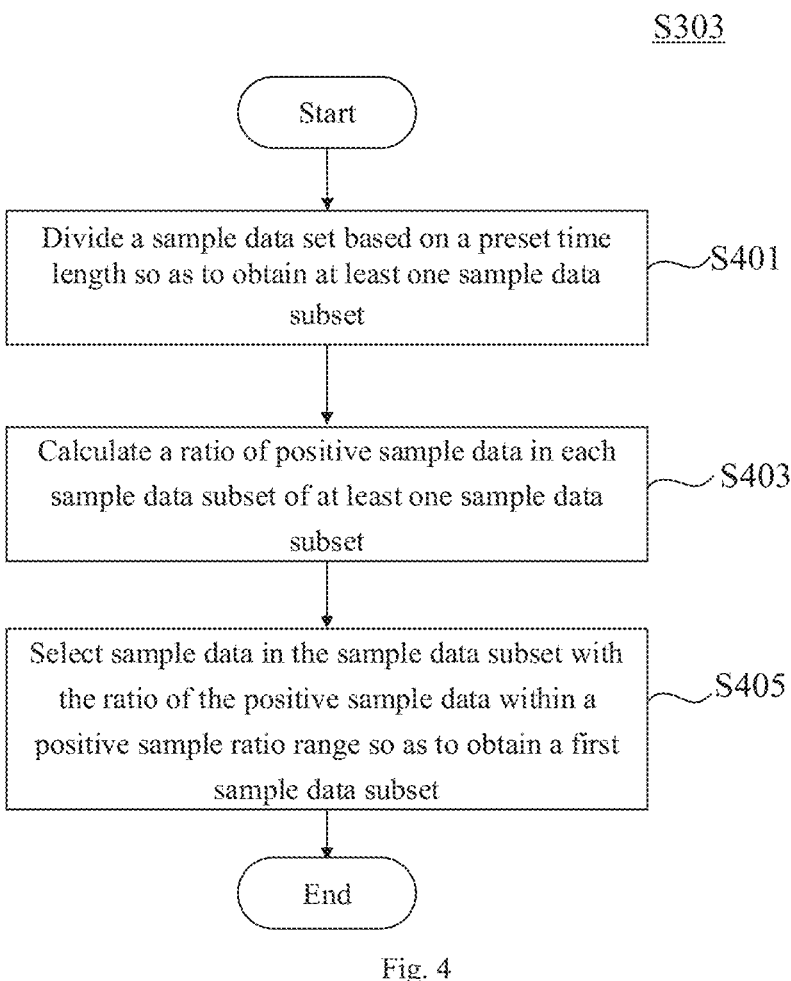
FIG. 4 shows a flow diagram of a method for obtaining a first sample data subset according to an embodiment of the present disclosure.

FIG. 4 shows a flow diagram of a method for obtaining a first sample data subset according to an embodiment of the present disclosure. According to some embodiments, the configuration information includes a positive sample ratio range, and step S303 includes: step S401, the sample data set is divided based on a preset time length to obtain at least one sample data subset; step S403, a ratio of positive sample data in each sample data subset of the at least one sample data subset is calculated; and step S405, sample data in the sample data subset with the ratio of the positive sample data within the positive sample ratio range are selected to obtain the first sample data subset. For example, in some examples, the preset time length is one month, and the sample data set may be divided by month to obtain a plurality of sample data subsets. The ratio of the positive sample data in each sample data subset of the plurality of sample data subsets is calculated, and if the ratio of the positive sample data in a certain sample data subset is too large or too small and not within the preset positive sample ratio range, then the sample data in this sample data subset are filtered.

Through this step, the impact of specific events that occur in a specific time period on the population may be excluded. For example, in a certain month, due to a system failure, 10 days of data are marked as positive sample data, resulting in inaccurate markings. By calculating the ratio of positive sample data in this month, it may be found in time that the ratio of the positive sample data is too large, thereby filtering out the data of this month.

According to some embodiments, the configuration information includes a missing value proportion threshold, and in step S303, a missing value proportion of each piece of sample data in the sample data set is obtained; and sample data with the missing value proportion smaller than the missing value proportion threshold are selected to generate the first sample data subset. For example, in some examples, there are 100 features in the data of the person C, but the data values corresponding to the 20 features are missing values, and it can be known from the calculation that the missing value proportion is 0.2. When the missing value proportion threshold is 0.3, since 0.2<0.3, the data of the person C are selected.

Through the step, sample data with too many missing values may be filtered out, the impact of missing values on the data analysis model can be reduced, and overfitting of non-missing values is avoided.

According to some embodiments, the configuration information includes an importance threshold condition and a ranking model name, and in step S305, a ranking model is determined according to the ranking model name; features in the first sample data subset are ranked with respect to importance based on the ranking model; and one or more features that satisfy the importance threshold condition in the first sample data subset are selected to generate the second sample data subset. By the ranking model, an order of importance of each feature may be calculated. The user may input the ranking model name in the configuration information to select the ranking model to be used, for example, it may be an XGBoost model or a lightGBM model. The first sample data subset is input into the ranking model selected by the user, and the order of importance of each feature may be obtained. In some examples, the importance threshold condition in the configuration information is 80%, and the features whose order of importance is in the top 80% are selected.

Through this step, the features with low importance may be filtered out to avoid overfitting of the data analysis model.

According to some embodiments, the configuration information includes at least one of an information value (IV) threshold, a popularity stability index (PSI) threshold and a variance inflation factor (VIF) threshold, and in step S305, at least one of: in response to determining that the configuration information includes the information value threshold, an information value of each feature in the first sample data subset is obtained, and features with the information value greater than the information value threshold are selected to generate the second sample data subset; in response to determining that the configuration information includes the popularity stability index threshold, a popularity stability index value of each feature in the first sample data subset is obtained, and features with the popularity stability index value greater than the popularity stability index threshold are selected to generate the second sample data subset; and in response to determining that the configuration information includes the variance inflation factor threshold, a variance inflation factor value of each feature in the first sample data subset is obtained, and features with the variance inflation factor value greater than the variance inflation factor threshold are selected to generate the second sample data subset. In some examples, after obtaining the information value, the popularity stability index value and the variance inflation factor value of each feature, a feature analysis report may also be generated, the evaluation report is a structured configuration file, and features may be selected according to the evaluation report.

The information value may be configured to measure the prediction ability of the features. For example, for a person E, a certain amount of information is required to judge whether the person E belongs to a positive sample or a negative sample. The required information is contained in all the features. For one feature P, the greater the information value of the feature P, the more information the feature P contains, and the greater the contribution of the feature P for determining whether the person E belongs to the positive sample or the negative sample, that is, the greater the IV value of the feature P, the more the feature P should be input into the data analysis model.

The popularity stability index value may be configured to measure a difference in the data distribution of a certain feature in different sample data sets. The smaller the PSI value of the feature, the smaller the difference, the better the stability of the feature in different sample data sets, the more the feature should be input into the data analysis model.

The variance inflation factor value is a measurement for measuring the severity of multicollinearity in a multiple linear regression model. Multicollinearity refers to the existence of a linear correlation between independent variables, that is, one independent variable may be a linear combination of one or several other independent variables. The closer the VIF value of the feature is to 1, the slighter the multicollinearity is, and the more the feature should be input into the data analysis model.

Through the above steps, the features with high information value, good stability and slight multicollinearity may be screened and input into the data analysis model, thereby reducing the computational time and an overfitting phenomenon.

According to some embodiments, the configuration information includes a type of a statistical value, and step S307 includes: at least one statistic value of each piece of prediction data in the second prediction data set within a preset time period is obtained; and the at least one statistical value is formed into a vector, and the vector is configured to replace corresponding data in the second prediction data set to generate a third sample data subset.

According to some embodiments, the type of the statistical value includes at least one of a mean, a variance, a range, a consecutively increasing number and a consecutively decreasing number.

For example, when training according to the sample data of the person A, a data value m corresponding to a feature M of the person A needs to be replaced with a vector. The data values corresponding to the feature M of the person A in the past 6 months are obtained, there are 6 data values in total, the mean value $m_1$, the variance $m_2$, the range $m_3$, the consecutively increasing number $m_4$ and the consecutively decreasing number $m_5$ of the 6 data values are calculated respectively, and a vector m' ($m_1$, $m_2$, $m_3$, $m_4$, $m_5$) is formed, and the data values m are replaced with the vector m' for computation in the data analysis model.

By replacing the original data with the vector formed by the statistical values, the impact of historical data may be taken into account in the data analysis model, and the accuracy of training is improved.

According to some embodiments, in response to determining that the feature is a discrete feature, a weight of evidence substitution operation is performed on the feature to generate the third sample data subset; or, in response to determining that the feature is a continuous feature, a binning operation is performed on the feature, and a weight of evidence substitution operation is performed to generate the third sample data subset.

For example, when training according to the sample data of the person A, it is necessary to perform the weight of evidence substitution operation on the discrete feature N to obtain a WOE value of a data value corresponding to the feature N; and the weight of evidence substitution operation is performed after the binning operation is performed on the continuous feature O to obtain a weight of evidence (WOE) value of a data value corresponding to the feature O. For the discrete feature N, the WOE value of the feature N is calculated according to a percentage of positive sample data and a percentage of negative sample data in the first sample data subset. For the continuous feature O, the continuous feature is converted into the discrete feature through the binning operation first, and then the WOE value of the feature O is calculated according to the percentage of the positive sample data and the percentage of the negative sample data in the first sample data subset.

Through the weight of evidence substitution operation, the original data value may be replaced with the WOE value of the data. Since in the binning operation, missing values may be individually binned, i.e., the missing values are given new values (the bins of the missing values), the data analysis models can handle the missing values. Meanwhile, since in the binning operation, abnormal values may be classified separately, thus reducing the impact of the abnormal values on the data analysis model.

According to some embodiments, the method 300 further includes: a performance evaluation index of the data analysis model is obtained; and in response to determining that the performance evaluation index of the data analysis model is out of a preset range, the configuration information is updated, and the data analysis model is trained according to the updated configuration information. In some examples, a model performance evaluation report may also be generated, and the model performance evaluation report is a structured configuration file in which the performance evaluation index of the data analysis model is recorded, and whether iteration is required may be determined according to the model performance evaluation report.

Through this step, the prediction performance of the data analysis model may be evaluated to determine whether the configuration information needs to be updated.

Figure 5:
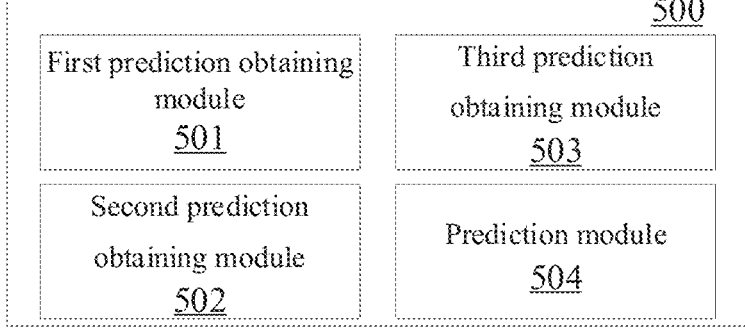
FIG. 5 shows a block diagram of a data processing apparatus according to an embodiment of the present disclosure.

According to an aspect of the present disclosure, a data processing apparatus 500 is provided, and as shown in FIG. 5, the apparatus 500 includes: a first prediction obtaining module 501, configured to obtain a first prediction data set, a model feature list and configuration information, wherein the model feature list indicates a plurality of features required by a data analysis model; a second prediction obtaining module 502, configured to generate a second prediction data set based on the model feature list and the first prediction data set, wherein the feature dimension of prediction data in the second prediction data set is smaller than the feature dimension of prediction data in the first prediction data set; a third prediction obtaining module 503, configured to perform feature transformation on a feature of the prediction data in the second prediction data set based on the configuration information to generate a third prediction data set; and a prediction module 504, configured to input the third prediction data set into the data analysis model to obtain a prediction result.

Figure 6:
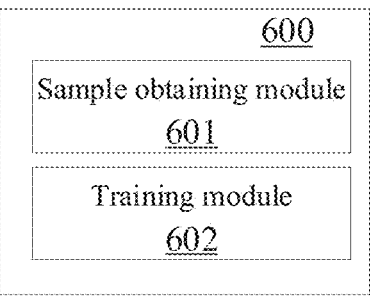
FIG. 6 shows a flow diagram of a model constructing apparatus according to an embodiment of the present disclosure.

According to an aspect of the present disclosure, an apparatus 600 for constructing a data analysis model is provided, and as shown in FIG. 6, the apparatus 600 includes: a sample obtaining module 601, configured to obtain an input from a user, wherein the input includes configuration information and a sample data set, and the configuration information is used to preprocess the sample data set; and a training module 602, configured to, based on the configuration information, select a first quantity of sample data from the sample data set to obtain a first sample data subset; generate a second sample data subset based on the first sample data subset, wherein the feature dimension of sample data in the second sample data subset is smaller than the feature dimension of sample data in the first sample data subset; perform feature transformation on a feature of the sample data in the second sample data subset to generate a third sample data subset; and train the data analysis model by using the third sample data subset.

According to an aspect of the present disclosure, an electronic device is provided, and includes: at least one processor; and a memory in communication connection with the at least one processor; wherein the memory stores instructions capable of being executed by the at least one processor, and the instructions are executed by the at least one processor to cause the at least one processor to be capable of executing the above methods.

According to an aspect of the present disclosure, a non transitory computer readable storage medium storing computer instructions is provided, wherein the computer instructions are configured to cause a computer to execute the above methods.

According to an aspect of the present disclosure, a computer program product is provided and includes a computer program, wherein the computer program, when executed by a processor, implements the above methods.

In the technical solution of the present disclosure, involved collection, storage, use, processing, transmission, providing, disclosure and others of personal information of users comply with the provisions of relevant laws and regulations, and do not violate public order and good customs.

Figure 7:
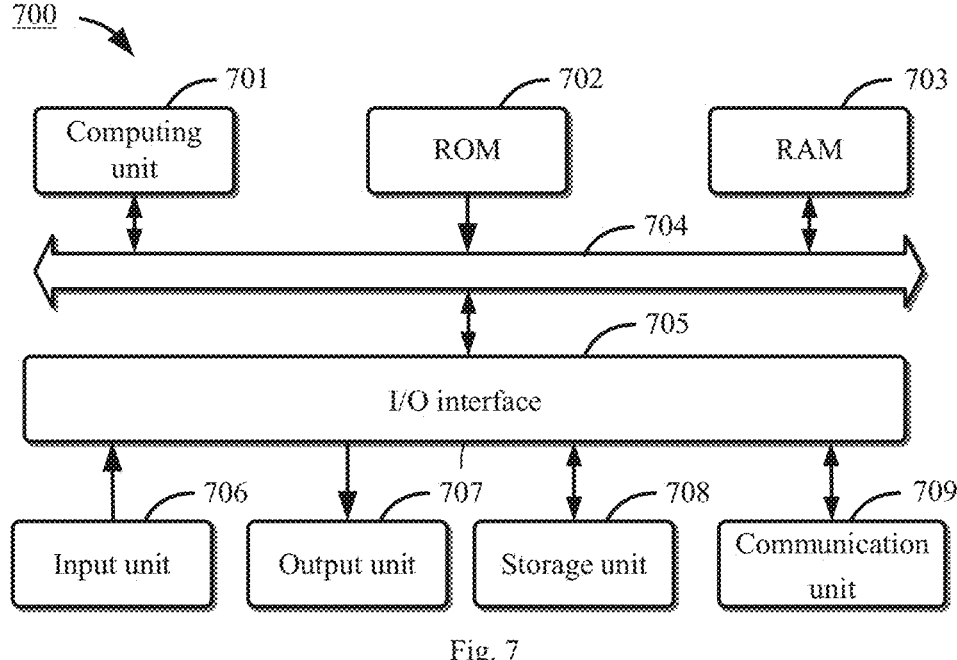
FIG. 7 shows a structural block diagram of an example electronic device capable of being configured to implement an embodiment of the present disclosure.

Referring to FIG. 7, a structural block diagram of an electronic device 700 that may serve as a server or a client of the present disclosure will now be described, and it is an example of a hardware device that may be applied to various aspects of the present disclosure. The electronic device is intended to represent various forms of digital electronic computer devices, such as, a laptop computer, a desktop computer, a workstation, a personal digital assistant, a server, a blade server, a mainframe computer, and other suitable computers. The electronic device may further represent various forms of mobile apparatuses, such as, personal digital processing, a cell phone, a smart phone, a wearable device and other similar computing apparatuses. The components shown herein, their connections and relationships, and their functions are merely used as examples, and are not intended to limit the implementations of the present disclosure described and/or required herein.

As shown in FIG. 7, the device 700 includes a computing unit 701 that may perform various appropriate actions and processing according to computer programs stored in a read-only memory (ROM) 702 or computer programs loaded from a storage unit 708 into a random access memory (RAM) 703. In the RAM 703, various programs and data required for the operation of the device 700 may also be stored. The computing unit 701, the ROM 702 and the RAM 703 are connected to each other through a bus 704. An input/output (I/O) interface 705 is also connected to the bus 704.

A plurality of components in the device 700 are connected to the I/O interface 705, including: an input unit 706, an output unit 707, the storage unit 708 and a communication unit 709. The input unit 706 may be any type of device capable of inputting information to the device 700. The input unit 706 may receive input digital or character information and generate key signal input related to user settings and/or function control of the electronic device, and may include but not limited to a mouse, a keyboard, a touch screen, a trackpad, a trackball, a joystick, a microphone and/or a remote control. The output unit 707 may be any type of device capable of presenting information, and may include but not limited to a display, a speaker, a video/audio output terminal, a vibrator and/or a printer. The storage unit 708 may include but not limited to a magnetic disk and an optical disk. The communication unit 709 allows the device 700 to exchange information/data with other devices through computer networks such as the Internet and/or various telecommunication networks, and may include but not limited to a modem, a network card, an infrared communication device, a wireless communication transceiver and/or a chipset, such as a Bluetooth™ device, a 802.11 device, a WiFi device, a WiMax device, a cellular communication device and/or the like.

The computing unit 701 may be various general-purpose and/or special-purpose processing components with processing and computing capabilities. Some examples of the computing unit 701 include but not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, etc. The computing unit 701 performs various methods and processing described above, such as the method 200 or the method 300. For example, in some embodiments, the method 200 or the method 300 may be implemented as a computer software program that is tangibly included in a machine-readable medium such as the storage unit 708. In some embodiments, some or all of the computer programs may be loaded and/or installed onto the device 700 through the ROM 702 and/or the communication unit 709. When the computer programs are loaded into the RAM 703 and executed by the computing unit 701, one or more steps of the method 200 or the method 300 described above may be performed. Alternatively, in other embodiments, the computing unit 701 may be configured to perform the method 200 or the method 300 in any other suitable manner (for example, by means of firmware).

Various implementations of the systems and technologies described above in this paper may be implemented in a digital electronic circuit system, an integrated circuit system, a field programmable gate array (FPGA), an application specific integrated circuit (ASIC), an application specific standard part (ASSP), a system on chip (SOC), a complex programmable logic device (CPLD), computer hardware, firmware, software and/or their combinations. These various implementations may include: being implemented in one or more computer programs, wherein the one or more computer programs may be executed and/or interpreted on a programmable system including at least one programmable processor, and the programmable processor may be a special-purpose or general-purpose programmable processor, and may receive data and instructions from a storage system, at least one input apparatus, and at least one output apparatus, and transmit the data and the instructions to the storage system, the at least one input apparatus, and the at least one output apparatus.

Program codes for implementing the methods of the present disclosure may be written in any combination of one or more programming languages. These program codes may be provided to processors or controllers of a general-purpose computer, a special-purpose computer or other programmable data processing apparatuses, so that when executed by the processors or controllers, the program codes enable the functions/operations specified in the flow diagrams and/or block diagrams to be implemented. The program codes may be executed completely on a machine, partially on the machine, partially on the machine and partially on a remote machine as a separate software package, or completely on the remote machine or server.

In the context of the present disclosure, a machine readable medium may be a tangible medium that may contain or store a program for use by or in connection with an instruction execution system, apparatus or device. The machine readable medium may be a machine readable signal medium or a machine readable storage medium. The machine readable medium may include but not limited to an electronic, magnetic, optical, electromagnetic, infrared, or semiconductor system, apparatus or device, or any suitable combination of the above contents. More specific examples of the machine readable storage medium will include electrical connections based on one or more lines, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above contents.

In order to provide interactions with users, the systems and techniques described herein may be implemented on a computer, and the computer has: a display apparatus for displaying information to the users (e.g., a CRT (cathode ray tube) or LCD (liquid crystal display) monitor); and a keyboard and a pointing device (e.g., a mouse or trackball), through which the users may provide input to the computer. Other types of apparatuses may further be used to provide interactions with users; for example, feedback provided to the users may be any form of sensory feedback (e.g., visual feedback, auditory feedback, or tactile feedback); and an input from the users may be received in any form (including acoustic input, voice input or tactile input).

The systems and techniques described herein may be implemented in a computing system including background components (e.g., as a data server), or a computing system including middleware components (e.g., an application server) or a computing system including front-end components (e.g., a user computer with a graphical user interface or a web browser through which a user may interact with the implementations of the systems and technologies described herein), or a computing system including any combination of such background components, middleware components, or front-end components. The components of the system may be interconnected by digital data communication (e.g., a communication network) in any form or medium. Examples of the communication network include: a local area network (LAN), a wide area network (WAN) and the Internet A computer system may include a client and a server. The client and the server are generally far away from each other and usually interact through a communication network. The relationship between the client and the server is generated by computer programs running on the corresponding computer and having a client-server relationship with each other. The server may be a cloud server, and may also be a server of a distributed system, or a server combined with a block chain.

It should be understood that the various forms of processes shown above may be configured to reorder, add, or delete steps. For example, the steps recorded in the present disclosure may be performed in parallel, sequentially or in different orders, as long as the desired results of the technical solution disclosed by the present disclosure can be achieved, which is not limited herein.

Although the embodiments or examples of the present disclosure have been described with reference to the accompanying drawings, it should be understood that the above methods, systems and devices are only example embodiments or examples, and the scope of the present invention is not limited by these embodiments or examples, but only by the authorized claims and their equivalent scope. Various elements in the embodiments or examples may be omitted or replaced by their equivalent elements. In addition, the steps may be performed in an order different from that described in the present disclosure. Further, various elements in the embodiments or examples may be combined in various ways. It is important that as technology evolves, many of the elements described herein may be replaced by equivalent elements that appear after the present disclosure.

The invention claimed is:

1. A method, comprising:

obtaining a first prediction data set, a model feature list and configuration information, wherein the model feature list indicates a plurality of features required by a data analysis model;

generating a second prediction data set based on the model feature list and the first prediction data set, wherein a first feature dimension of prediction data in the second prediction data set is smaller than a second feature dimension of prediction data in the first prediction data set;

performing feature transformation on a feature of the prediction data in the second prediction data set based on the configuration information to generate a third prediction data set; and inputting the third prediction data set into the data analysis model to obtain a prediction result, wherein the data analysis model is trained through actions including:

obtaining an input from a user, wherein the input comprises configuration information and a sample data set, and the configuration information is used to preprocess the sample data set; and based on the configuration information, selecting a first quantity of sample data from the sample data set to obtain a first sample data subset;

generating a second sample data subset based on the first sample data subset, wherein the first feature dimension of sample data in the second sample data subset is smaller than the second feature dimension of sample data in the first sample data subset;

performing feature transformation on a feature of the sample data in the second sample data subset to generate a third sample data subset; and training the data analysis model by using the third sample data subset, wherein the configuration information comprises at least one of: an information value threshold, a popularity stability index threshold and a variance inflation factor threshold, and wherein generating the second sample data subset based on the first sample data subset comprises at least one of following actions:

obtaining, in response to determining that the configuration information comprises the information value threshold, an information value of each feature in the first sample data subset, and selecting at least one feature with the information value greater than the information value threshold to generate the second sample data subset;

obtaining, in response to determining that the configuration information comprises the popularity stability index threshold, a popularity stability index value of each feature in the first sample data subset, and selecting at least one feature with the popularity stability index value greater than the popularity stability index threshold to generate the second sample data subset; and obtaining, in response to determining that the configuration information comprises the variance inflation factor threshold, a variance inflation factor value of each feature in the first sample data subset, and selecting at least one feature with the variance inflation factor value greater than the variance inflation factor threshold to generate the second sample data subset.

2. The method according to claim 1, further comprising:

calculating a performance evaluation index of the data analysis model according to the prediction result; and giving out an alert in response to determining that the performance evaluation index is out of a preset threshold range.

3. The method according to claim 1, wherein the configuration information comprises a type of a statistical value, and wherein performing feature transformation on the feature of the prediction data in the second prediction data set based on the configuration information to generate the third prediction data set comprises:

obtaining at least one statistical value of each piece of prediction data in the second prediction data set within a preset time period; and forming the at least one statistical value into a vector, and using the vector to replace data corresponding to the statistical value in the second prediction data set to obtain the third prediction data set.

4. The method according to claim 3, wherein the type of the statistical value comprises at least one of: a mean, a variance, a range, a number of times that are consecutively increased and a number of times that are consecutively decreased.

5. The method according to claim 1, wherein performing feature transformation on the feature of the prediction data in the second prediction data set based on the configuration information to generate the third prediction data set comprises:

performing, in response to determining that the feature of the prediction data in the second prediction data set is a discrete feature, a weight of evidence substitution operation on the feature of the prediction data in the second prediction data set.

6. The method according to claim 1, wherein performing feature transformation on the feature of the prediction data in the second prediction data set based on the configuration information to generate the third prediction data set comprises:

performing, in response to determining that the feature of the prediction data in the second prediction data set is a continuous feature, at least one of: a binning operation and a weight of evidence substitution operation on the feature of the prediction data in the second prediction data set to obtain the third prediction data set.

7. The method according to claim 1, further comprising:

obtaining a performance evaluation index of the data analysis model; and updating, in response to determining that the performance evaluation index of the data analysis model is out of a preset range, the configuration information, and training the data analysis model according to the updated configuration information.

8. The method according to claim 1, wherein the configuration information comprises a positive sample ratio range, and wherein selecting the first quantity of sample data from the sample data set to obtain the first sample data subset comprises:

dividing the sample data set based on a preset time length to obtain at least one sample data subset;

calculating a ratio of positive sample data in each sample data subset of the at least one sample data subset; and selecting sample data in the sample data subset with the ratio of the positive sample data within the positive sample ratio range to obtain the first sample data subset.

9. The method according to claim 1, wherein the configuration information comprises a missing value proportion threshold, and wherein selecting the first quantity of sample data from the sample data set to obtain the first sample data subset comprises:

obtaining a missing value proportion of each piece of sample data in the sample data set; and selecting sample data with the missing value proportion smaller than the missing value proportion threshold to generate the first sample data subset.

10. The method according to claim 1, wherein the configuration information comprises an importance threshold condition and a ranking model name, and wherein generating the second sample data subset based on the first sample data subset comprises:

determining a ranking model according to the ranking model name;

ranking features in the first sample data subset with respect to importance based on the ranking model; and selecting at least one feature that satisfy the importance threshold condition in the first sample data subset to generate the second sample data subset.

11. The method according to claim 1, wherein the configuration information comprises a type of a statistical value, and wherein performing feature transformation on the feature of the sample data in the second sample data subset to generate the third sample data subset comprises:

obtaining at least one statistical value of each piece of sample data in the second sample data subset within a preset time period; and forming the at least one statistical value into a vector, and using the vector to replace data corresponding to the statistical value in the second sample data subset to obtain the third sample data subset.

12. The method according to claim 11, wherein the type of the statistical value comprises at least one of: a mean, a variance, a range, a consecutively increasing number and a consecutively decreasing number.

13. The method according to claim 1, wherein performing feature transformation on the feature of the sample data in the second sample data subset to generate the third sample data subset comprises:

performing, in response to determining that the feature is a discrete feature, a weight of evidence substitution operation on the feature to generate the third sample data subset; or performing, in response to determining that the feature is a continuous feature, a binning operation on the feature, and performing a weight of evidence substitution operation to generate the third sample data subset.

14. An electronic device, comprising:

one or more processors;

a memory storing one or more programs configured to be executed by the one or more processors, the one or more programs including instructions for:

obtaining a first prediction data set, a model feature list and configuration information, wherein the model feature list indicates a plurality of features required by a data analysis model;

generating a second prediction data set based on the model feature list and the first prediction data set, wherein a first feature dimension of prediction data in the second prediction data set is smaller than a second feature dimension of prediction data in the first prediction data set;

performing feature transformation on a feature of the prediction data in the second prediction data set based on the configuration information to generate a third prediction data set; and inputting the third prediction data set into the data analysis model to obtain a prediction result, wherein the data analysis model is trained through actions including:

obtaining an input from a user, wherein the input comprises configuration information and a sample data set, and the configuration information is used to preprocess the sample data set; and based on the configuration information, selecting a first quantity of sample data from the sample data set to obtain a first sample data subset;

generating a second sample data subset based on the first sample data subset, wherein the first feature dimension of sample data in the second sample data subset is smaller than the second feature dimension of sample data in the first sample data subset;

performing feature transformation on a feature of the sample data in the second sample data subset to generate a third sample data subset; and training the data analysis model by using the third sample data subset, wherein the configuration information comprises at least one of: an information value threshold, a popularity stability index threshold and a variance inflation factor threshold, and wherein generating the second sample data subset based on the first sample data subset comprises at least one of following actions:

obtaining, in response to determining that the configuration information comprises the information value threshold, an information value of each feature in the first sample data subset, and selecting at least one feature with the information value greater than the information value threshold to generate the second sample data subset;

obtaining, in response to determining that the configuration information comprises the popularity stability index threshold, a popularity stability index value of each feature in the first sample data subset, and selecting at least one feature with the popularity stability index value greater than the popularity stability index threshold to generate the second sample data subset; and obtaining, in response to determining that the configuration information comprises the variance inflation factor threshold, a variance inflation factor value of each feature in the first sample data subset, and selecting at least one feature with the variance inflation factor value greater than the variance inflation factor threshold to generate the second sample data subset.

15. The electronic device according to claim 14, wherein the one or more programs further comprising instructions for:

calculating a performance evaluation index of the data analysis model according to the prediction result; and giving out an alert in response to determining that the performance evaluation index is out of a preset threshold range.

16. The electronic device according to claim 14, wherein the configuration information comprises a type of a statistical value, and wherein performing feature transformation on the feature of the prediction data in the second prediction data set based on the configuration information to generate the third prediction data set comprises:

obtaining at least one statistical value of each piece of prediction data in the second prediction data set within a preset time period; and forming the at least one statistical value into a vector, and using the vector to replace data corresponding to the statistical value in the second prediction data set to obtain the third prediction data set.

17. The electronic device according to claim 16, wherein the type of the statistical value comprises at least one of: a mean, a variance, a range, a consecutively increasing number and a consecutively decreasing number.

18. A non-transitory computer-readable storage medium storing one or more programs, the one or more programs comprising instructions, which when executed by one or more processors of an electronic device, cause the electronic device to:

obtaining a first prediction data set, a model feature list and configuration information, wherein the model feature list indicates a plurality of features required by a data analysis model;

generating a second prediction data set based on the model feature list and the first prediction data set, wherein a first feature dimension of prediction data in the second prediction data set is smaller than a second feature dimension of prediction data in the first prediction data set;

performing feature transformation on a feature of the prediction data in the second prediction data set based on the configuration information to generate a third prediction data set; and inputting the third prediction data set into the data analysis model to obtain a prediction result, wherein the data analysis model is trained through actions including:

obtaining an input from a user, wherein the input comprises configuration information and a sample data set, and the configuration information is used to preprocess the sample data set; and based on the configuration information, selecting a first quantity of sample data from the sample data set to obtain a first sample data subset;

generating a second sample data subset based on the first sample data subset, wherein the first feature dimension of sample data in the second sample data subset is smaller than the second feature dimension of sample data in the first sample data subset;

performing feature transformation on a feature of the sample data in the second sample data subset to generate a third sample data subset; and training the data analysis model by using the third sample data subset, wherein the configuration information comprises at least one of: an information value threshold, a popularity stability index threshold and a variance inflation factor threshold, and wherein generating the second sample data subset based on the first sample data subset comprises at least one of following actions:

obtaining, in response to determining that the configuration information comprises the information value threshold, an information value of each feature in the first sample data subset, and selecting at least one feature with the information value greater than the information value threshold to generate the second sample data subset;

obtaining, in response to determining that the configuration information comprises the popularity stability index threshold, a popularity stability index value of each feature in the first sample data subset, and selecting at least one feature with the popularity stability index value greater than the popularity stability index threshold to generate the second sample data subset; and obtaining, in response to determining that the configuration information comprises the variance inflation factor threshold, a variance inflation factor value of each feature in the first sample data subset, and selecting at least one feature with the variance inflation factor value greater than the variance inflation factor threshold to generate the second sample data subset.

* * * * *